United States Patent
Wada (10) Patent No.: US 10,041,601 B2
(45) Date of Patent: Aug. 7, 2018

(54) VALVE DEVICE

(71) Applicant: NIFCO INC., Yokosuka-shi, Kanagawa (JP)

(72) Inventor: Toshio Wada, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/309,831

(22) PCT Filed: Apr. 24, 2015

(86) PCT No.: PCT/JP2015/062578
§ 371 (c)(1),
(2) Date: Nov. 9, 2016

(87) PCT Pub. No.: WO2015/170619
PCT Pub. Date: Nov. 12, 2015

(65) Prior Publication Data
US 2017/0138499 A1    May 18, 2017

(30) Foreign Application Priority Data
May 9, 2014  (JP) .................................. 2014-097411

(51) Int. Cl.
*F16K 24/04*   (2006.01)
*F16K 27/02*   (2006.01)
(Continued)

(52) U.S. Cl.
CPC .... *F16K 27/0209* (2013.01); *B60K 15/03519* (2013.01); *F16K 15/021* (2013.01)

(58) Field of Classification Search
CPC .. F16K 27/0209; F16K 15/021; F16K 24/044; F02M 25/0836; B60K 15/035;
(Continued)

(56) References Cited

U.S. PATENT DOCUMENTS 4,886,089 A    12/1989   Gabrlik et al.
5,687,778 A *  11/1997   Harris ................ B60K 15/0406
                                                137/43
(Continued)

FOREIGN PATENT DOCUMENTS

CN   1353260 A    6/2002
CN   101487542 A  7/2009
(Continued)

OTHER PUBLICATIONS

PCT International Search Report of PCT/JP2015/062578 dated Jul. 28, 2015.
(Continued)

*Primary Examiner* — Reinaldo Sanchez-Medina
(74) *Attorney, Agent, or Firm* — Manabu Kanesaka (57) ABSTRACT

A valve device includes a float constituting a lower valve body and a case accommodating the float, and constitutes a part of an airflow passage of a fuel tank. The valve device includes a top portion of the case formed with a first penetration hole, a cylindrical seal body with a part that is fit in the first penetration hole and is sandwiched between the top portion and a sandwich member having a second penetration hole and combined with the top portion from above the top portion, an inside of the seal body communicating with the second penetration hole of the sandwich member, and an upper valve body above the sandwich member and configured to open and close the second penetration hole.

9 Claims, 9 Drawing Sheets

(51) Int. Cl.
*B60K 15/035* (2006.01)
*F16K 15/02* (2006.01)

(58) Field of Classification Search
CPC ......... B60K 15/03519; Y10T 137/0874; Y10T 137/3099
USPC ......... 137/409, 202, 43, 199, 198, 197, 532, 137/533, 533.17; 251/361
See application file for complete search history.

(56) References Cited

U.S. PATENT DOCUMENTS

| | | | | |
|---|---|---|---|---|
| 6,230,732 | B1 * | 5/2001 | Ganachaud | B60K 15/03519 137/39 |
| 6,371,146 | B1 | 4/2002 | Benjey | |
| 6,561,211 | B2 * | 5/2003 | Devall | B60K 15/03504 137/202 |
| 6,834,771 | B2 * | 12/2004 | Suzuki | B29C 65/20 137/202 |
| 6,966,330 | B2 * | 11/2005 | Frohwein | F16K 24/04 137/202 |
| 7,543,597 | B2 * | 6/2009 | Leonhardt | F16K 24/048 137/202 |
| 8,171,952 | B2 * | 5/2012 | Martin | B60K 15/035 137/198 |
| 9,586,475 | B2 * | 3/2017 | Honda | B60K 15/035 |
| 2003/0111111 | A1 | 6/2003 | Zorine et al. | |
| 2004/0011401 | A1 * | 1/2004 | Kato | B60K 15/03519 137/202 |
| 2005/0284875 | A1 | 12/2005 | Kito | |
| 2006/0086388 | A1 * | 4/2006 | Fye | F16K 24/048 137/202 |
| 2006/0213553 | A1 * | 9/2006 | Mills | B60K 15/03519 137/43 |
| 2010/0132805 | A1 * | 6/2010 | Kshirsagar | F16K 24/046 137/202 |

FOREIGN PATENT DOCUMENTS

| | | |
|---|---|---|
| EP | 1199207 A2 | 4/2002 |
| JP | 2002-021667 A | 1/2002 |
| JP | 5132500 B2 | 1/2013 |
| KR | 1020100032818 A | 3/2010 |

OTHER PUBLICATIONS

China Patent Office, "Office Action for Chinese Patent Application No. 201580029219.7," dated Mar. 29, 2018.
Europe Patent Office, "Search Report for European Patent Application No. 15788902.3," dated Jan. 10, 2018.

* cited by examiner

VALVE DEVICE

TECHNICAL FIELD

The present invention relates to an improvement of a valve device attached to a fuel tank of an automobile, a two-wheeled motor vehicle, and the like, and achieves a function to allow the outside and the inside of a fuel tank to communicate with each other in an open valve state.

BACKGROUND ART

There exists a valve device constituting an airflow passage of a fuel tank and having a float chamber at a lower side and an airflow chamber at an upper side, in which a port edge at the lower side of the airflow port provided in a separation wall for separating the float chamber and the airflow chamber is defined as a valve seat for the float valve, and a port edge at the upper side of the airflow port is defined as a valve seat for a check valve accommodated in the airflow chamber (see Patent Literature 1).

For this type of valve device, it is necessary to change the size of the airflow port in order to change and adjust flow rate characteristics and the open valve pressure. In this case, in the case of the valve device described in Patent Literature 1, it is necessary to replace the entire case main body having the airflow port in order to change and adjust the flow rate characteristics and the like.

CITATION LIST

Patent Literature

Patent Literature 1: U.S. Pat. No. 5,132,500

SUMMARY OF INVENTION

Technical Problem

A main problem solved by the present invention is to extremely easily change and adjust flow rate characteristics and an open valve pressure in this type of valve device.

Solution to Problem

To solve the above problem, the present invention provides a valve device including a float constituting a lower valve body and a case accommodating the float, and constituting a part of an airflow passage of a fuel tank, the valve device. The valve device includes a top portion of the case formed with a first penetration hole, a cylindrical seal body with a part that is fit in the first penetration hole and is sandwiched between the top portion and a sandwich member having a second penetration hole and combined with the top portion from above the top portion, an inside of the seal body communicating with the second penetration hole of the sandwich member, and an upper valve body above the sandwich member and configured to open and close the second penetration hole.

With the valve device, firstly, the sandwich member is combined with the top portion of the case, and the cylindrical seal body capable of constituting the valve seat of the lower valve body can be provided in the top portion of the case in a rigid manner with a simple structure. Secondly, the portion of the cylindrical seal body is sandwiched by the top portion and the sandwich member, so that the top portion and the cylindrical seal body can be sealed in an air-tight state, and the cylindrical seal body and the sandwich member can be sealed in an air-tight state.

Thirdly, the configuration of both or any one of the sandwich member and the upper valve body is changed without changing any configuration other than the sandwich member and the upper valve body, so that, for example, the flow rate characteristics of the valve device and the open valve pressure can be easily adjusted as necessity by changing the hole diameter of the second penetration hole and the weight of the upper valve body. A valve device having different characteristics and the like can be easily provided by sharing main components.

When the part of the cylindrical seal body is used as an external flange portion sandwiched between the top portion and the sandwich member, the external flange portion can be brought into pressurized contact with a hole edge portion of the first penetration hole of the top portion and the hole edge portion of the second penetration hole of the sandwich member in such a state that the external flange portion is elastically deformed, so that the communication of air between the lower chamber and the upper chamber is performed only through the inside of the cylindrical seal body.

It is a preferred aspect of the present invention to configure that the upper valve body is a valve body constituting a check valve that opens and closes in accordance with a pressure difference between the inside and the outside of the tank. In this case, further, it is a preferred aspect of the present invention to configure that the upper valve body is seated by its own weight to close the second penetration hole, and is configured to be separated therefrom in accordance with an increase of the pressure in the tank to open the second penetration hole.

It is one of the preferred aspects of the present invention to configure that any one of a top portion of the case and the sandwich member is provided with an engaging claw that is engaged with the engaged unit provided on the other of the top portion of the case and the sandwich member.

Advantageous Effects of Invention

With the valve device according to the present invention, the flow rate characteristics and the open valve pressure can be changed and adjusted by changing the configuration of both or any one of the sandwich member and the upper valve body without changing any configuration other than the sandwich member and the upper valve body.

DESCRIPTION OF EMBODIMENTS

Hereinafter, a typical embodiment of the present invention will be described with reference to FIGS. 1 to 10. A valve device according to this embodiment is attached to a fuel tank T of an automobile and a two-wheeled motor vehicle to form a part of an airflow passage C of the fuel tank T, and achieves a function to allow the outside and the inside of the fuel tank T to communicate with each other in an open valve state (see FIGS. 5 to 8).

Typically, the valve device is attached to the upper side of the fuel tank T to form a part of the airflow passage C of the fuel tank T. As shown in the example in the drawing, the valve device can be provided in the fuel tank T by using, e.g., an attachment hole Tb provided in the fuel tank T or by using a bracket and the like provided inside of the fuel tank T, which is not shown.

The valve device includes a float 1' constituting a lower valve body 1, a case 2 accommodating the float 1', and an upper valve body 3.

In the example of the drawing, a flange 4 is combined with the upper portion of the case 2, and a cap 5 is combined with the lower portion of the case 2, so that an outer hull of the valve device is formed by the case 2, the flange 4, and the cap 5. A lower chamber L accommodating the float 1' is formed below a top portion 2a of the case 2, and an upper chamber U accommodating the upper valve body 3 is formed above the top portion 2a of the case 2. The case 2, the flange 4, and the cap 5 are typically made of plastics.

The case 2 has the top portion 2a, and has a circular first penetration hole 2b in the center of this top portion 2a. The case 2 forms a substantially cylindrical shape, a lower end of which is opened. The top portion 2a is integrally coupled with the lower end of a small-size cylindrical portion 2c surrounding the first penetration hole 2b. The external diameter of the small-size cylindrical portion 2c is smaller than the external diameter of the case 2 under the top portion 2a. A peripheral step surface 2d is formed above the case 2. A peripheral groove 2e is formed in the external peripheral portion of the small-size cylindrical portion 2c (see FIG. 3).

The flange 4 includes a small-size cylindrical shape portion 4a having substantially the same internal diameter as the external diameter of the small-size cylindrical portion 2c of the case 2 and configured to have the cylinder upper end closed and have the cylinder lower end open, an external flange portion 4b formed at the cylinder lower end of the small-size cylindrical shape portion 4a, and a discharge port 4c a tube end of which is integrally in communication with a side portion of the small-size cylindrical shape portion 4a to form a tube shape extending horizontally.

Figure 6:
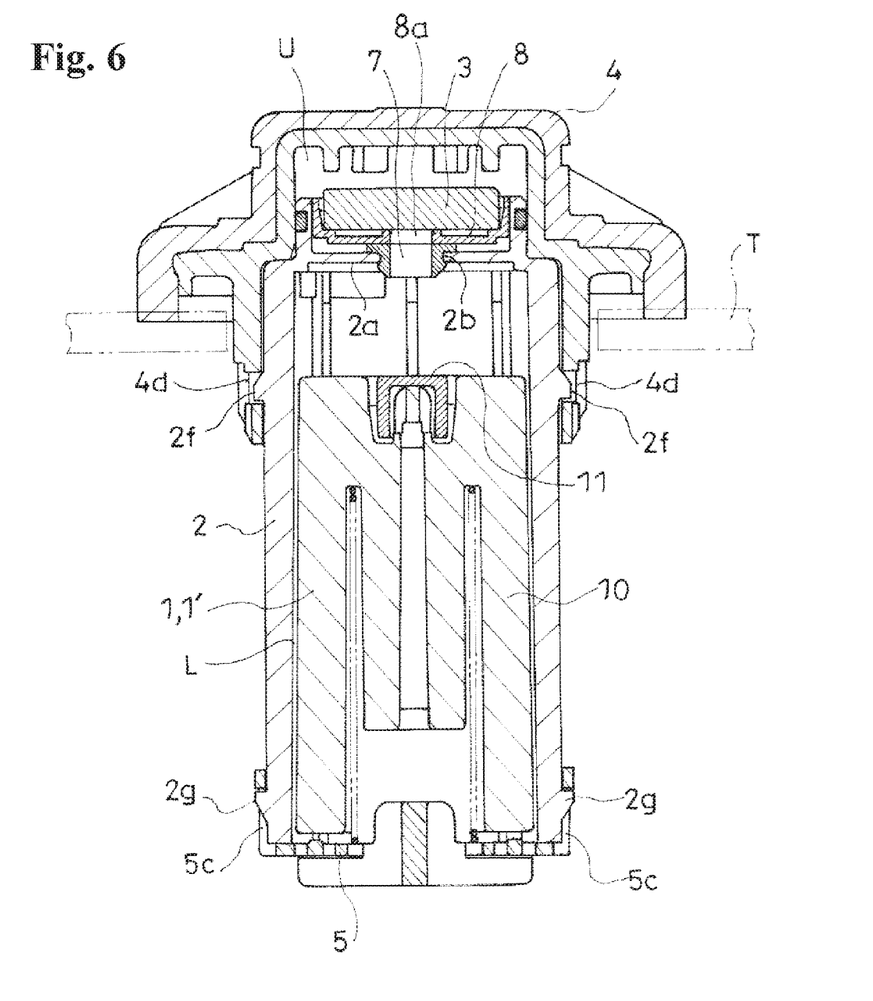
FIG. 6 is a cross sectional view taken along line B-B of FIG. 4, and illustrates a state where a float is at a descended position.
Figure 7:
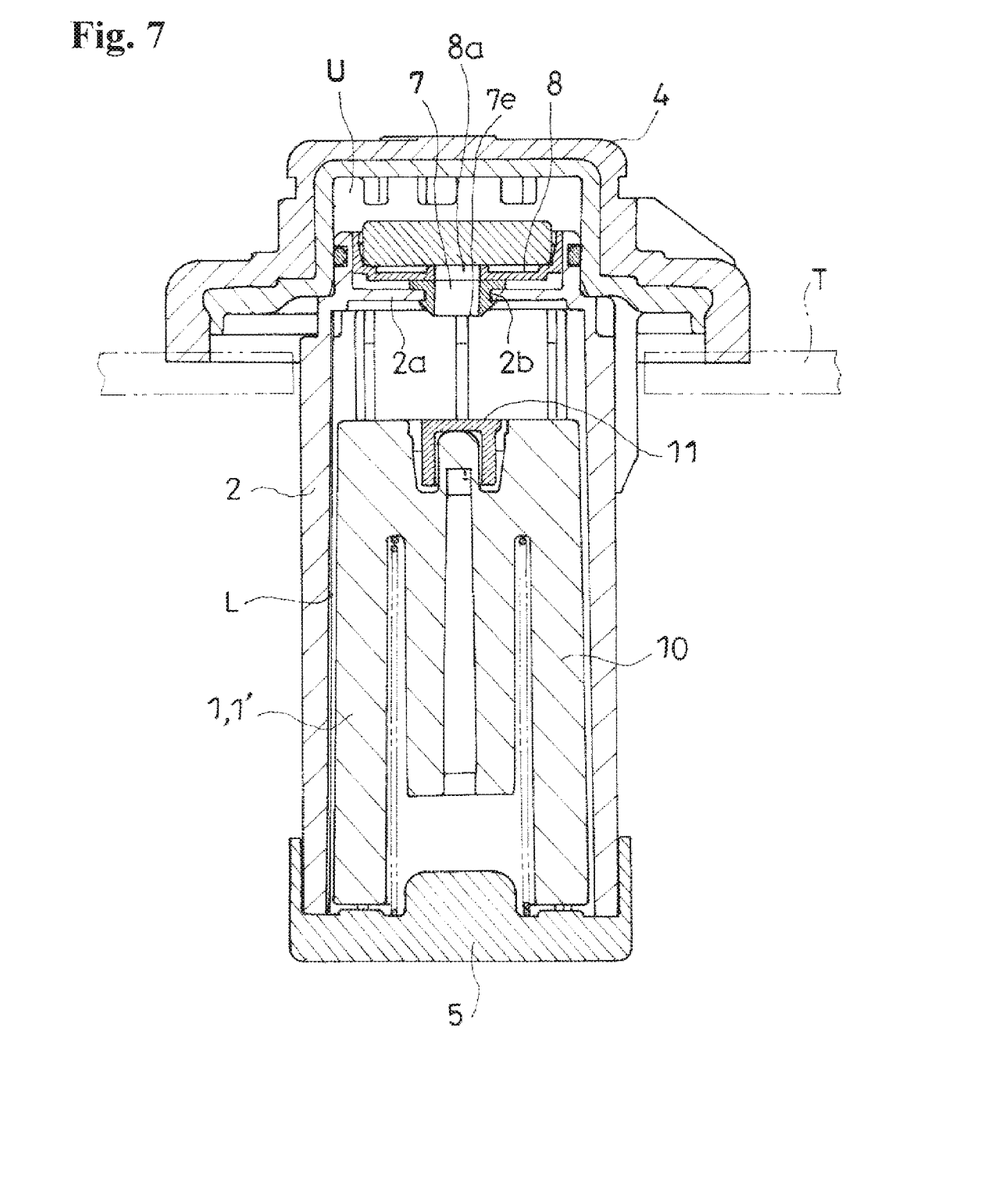
FIG. 7 is a cross sectional view taken along line C-C of FIG. 4, and illustrates a state where a float is at a descended position.
Figure 8:
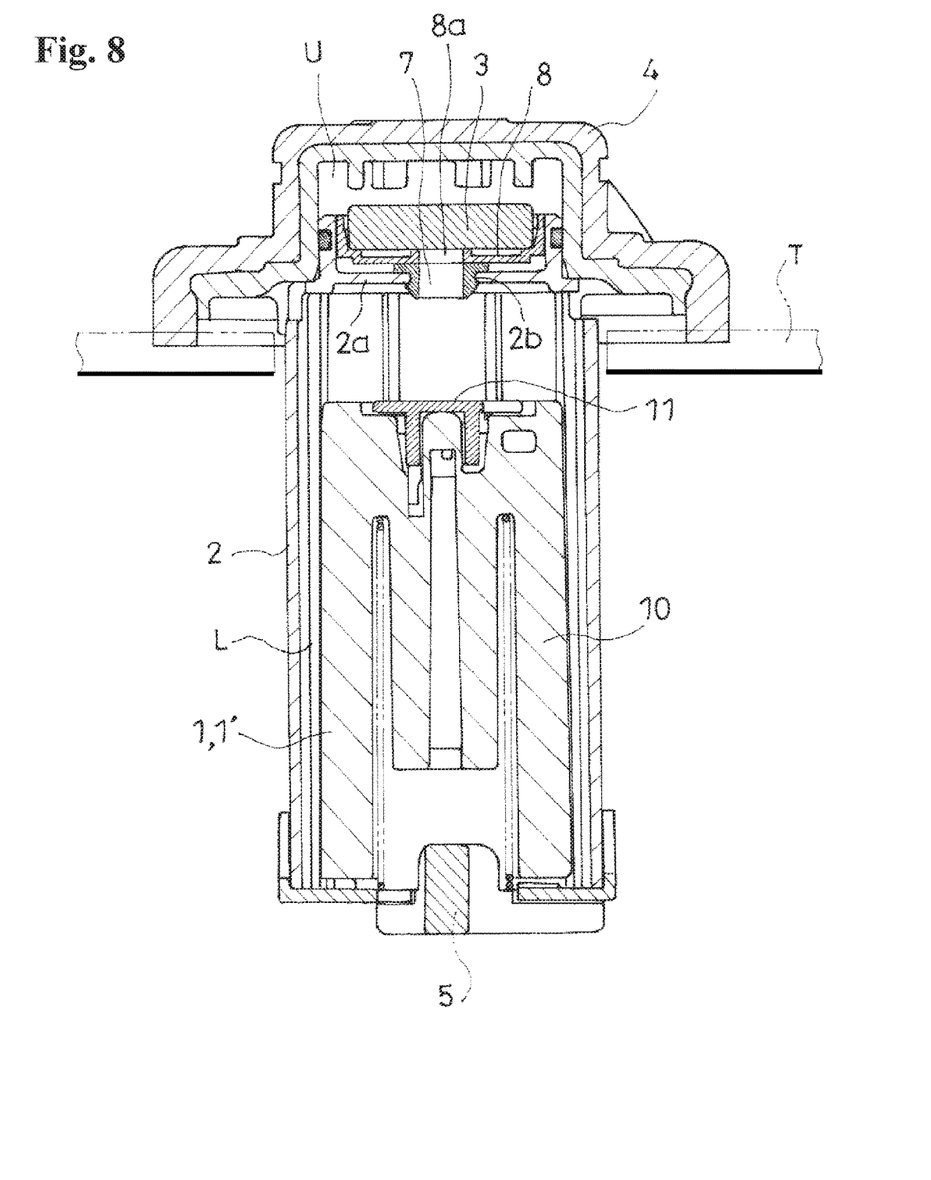
FIG. 8 is a cross sectional view taken along line D-D of FIG. 4, and illustrates a state where a float is at a descended position.

The case 2 and the flange 4 are integrated by causing the small-size cylindrical portion 2c of the case 2 to be engaged in the small-size cylindrical shape portion 4a until the peripheral step surface 2d of the case 2 comes into abutment with the external flange portion 4b of the flange 4. The upper chamber U is formed between the top portion 2a and the closed end of small-size cylindrical shape portion 4a when the case 2 and the flange 4 are assembled in this manner. In the drawing, reference numeral 6 denotes a seal ring attached to the small-size cylindrical portion 2c by using the peripheral groove 2e, and with this seal ring 6, the small-size cylindrical portion 2c and the small-size cylindrical shape portion 4a are kept in an air-tight state. In FIG. 6, reference numeral 2f denotes an engaging unit formed at an outside portion of the case 2, and in the example of the drawing, this engaging unit 2f is engaged with an engaged unit 4d of the flange 4, so that the assembly state of the case 2 and the flange 4 is maintained.

Figure 1:
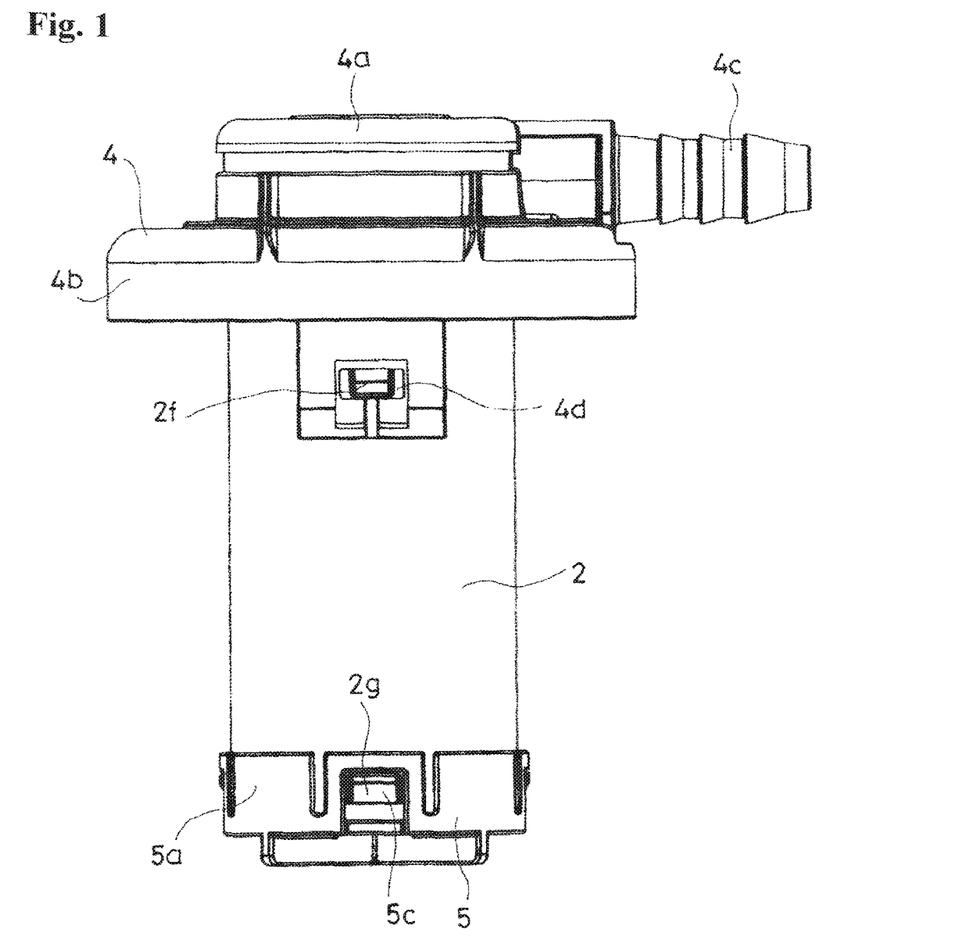
FIG. 1 is a side view illustrating a valve device according to an embodiment of the present invention.
Figure 2:
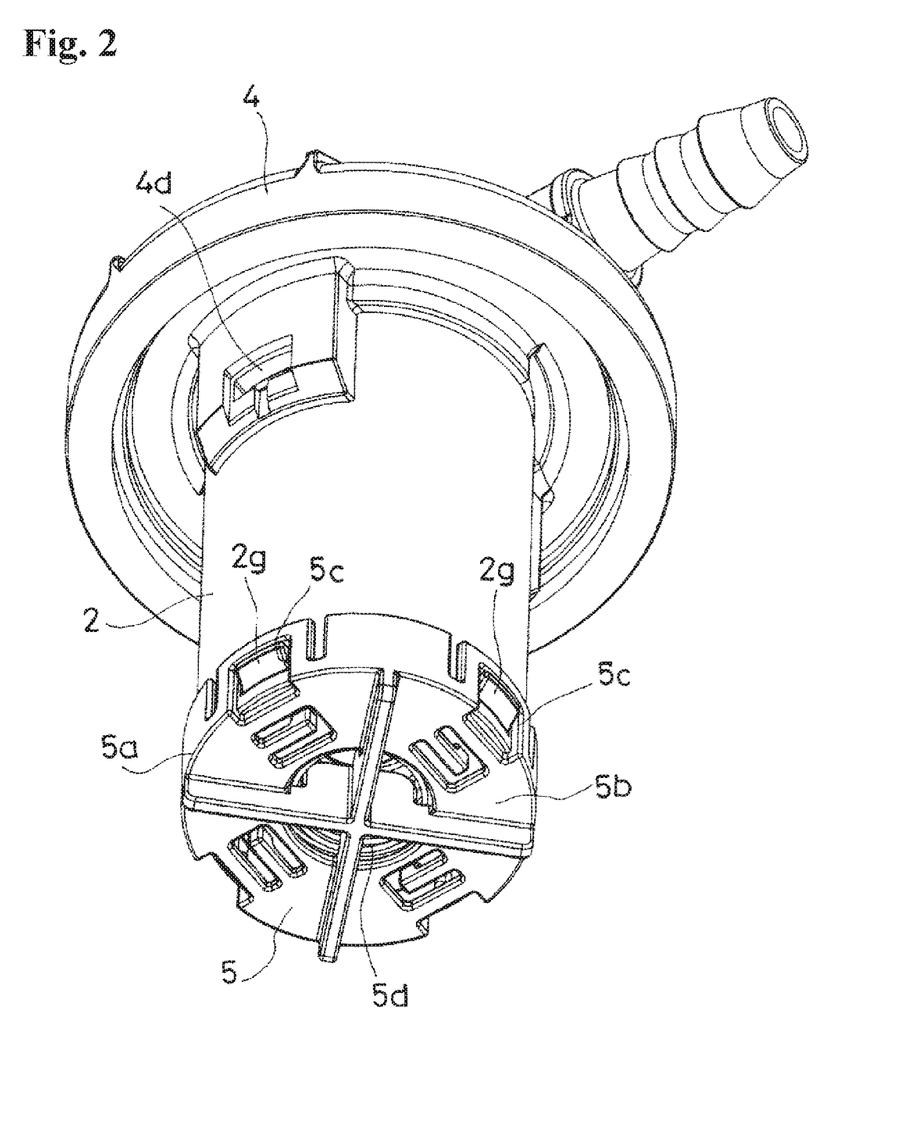
FIG. 2 is a perspective view illustrating the valve device.
Figure 3:
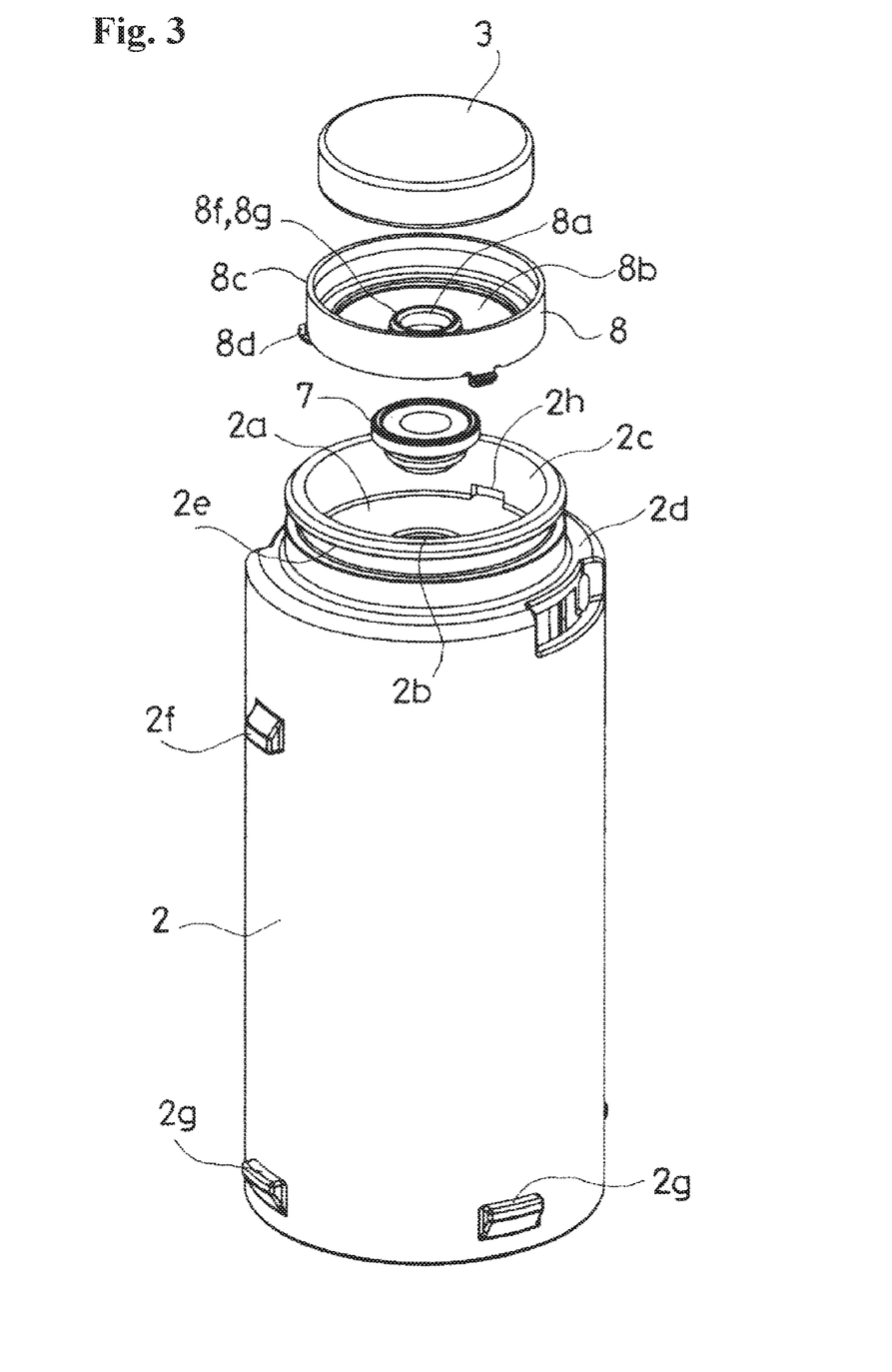
FIG. 3 is an exploded perspective view illustrating an upper valve body, a sandwich member, a cylindrical seal body, and a case constituting the valve device.
Figure 4:
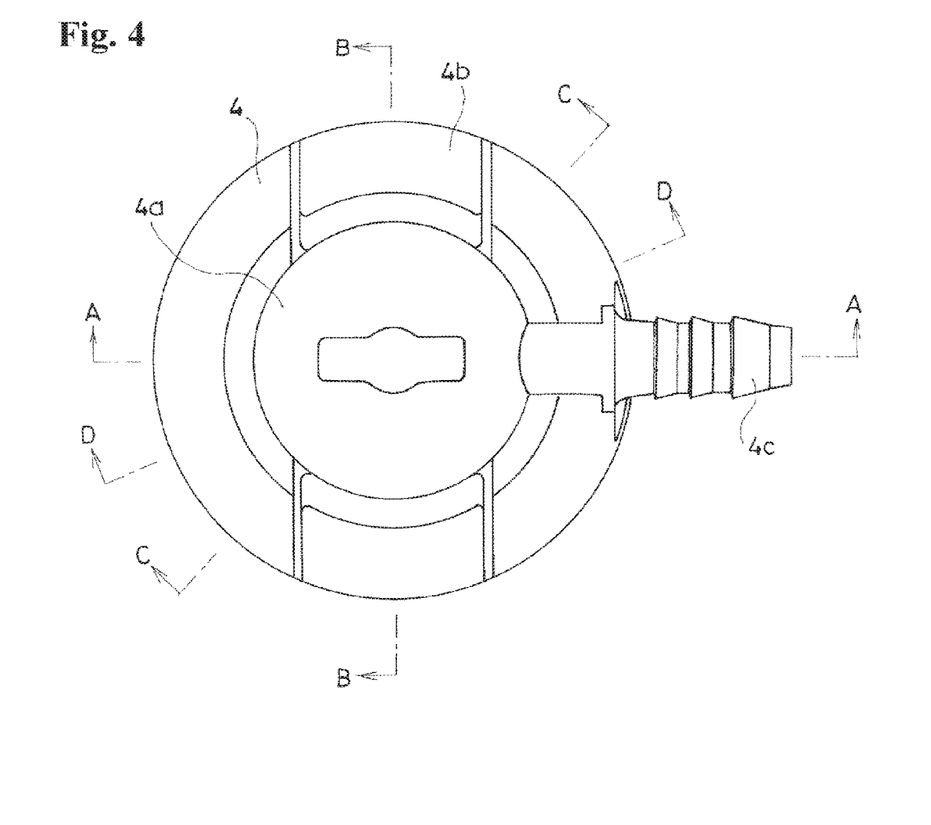
FIG. 4 is a top view illustrating the valve device.

The cap 5 includes a small-size cylindrical shape portion 5a having substantially the same internal diameter as the external diameter of the lower end of the case 2 and a bottom plate 5b for closing the cylinder lower end of this small-size cylindrical shape portion 5a (see FIG. 2). When the lower end side of the case 2 has been put into the cap 5 after the float 1' is accommodated under the top portion 2a of the case 2, an engagement protrusion portion 2g formed on the case 2 is engaged with an engagement window 5c formed in the small-size cylindrical shape portion 5a of the cap 5, so that the lower end of the case 2 is closed by the cap 5, and the float 1', which is at a descended position, is supported by the bottom plate 5b of this cap 5. An inlet portion 5d is formed in the bottom plate 5b of the cap 5.

A cylindrical seal body 7 is provided above the case 2. According to this embodiment, a portion of the cylindrical seal body 7 that is fit into the first penetration hole 2b and that has its inside in communication with a second penetration hole 8a is sandwiched between the top portion 2a of the case 2 formed with the first penetration hole 2b and a sandwich member 8 that is coupled with this top portion 2a from above this top portion 2a and that has the second penetration hole 8a. The upper valve body 3 for opening and closing the second penetration hole 8a is provided on the sandwich member 8.

The cylindrical seal body 7 is made of plastics having rubber or rubber-like elasticity. In the example of the drawing, the cylindrical seal body 7 has an external flange portion 7a in a peripheral form, which is provided at the cylinder upper end (see FIG. 10). A peripheral ridge 7b is formed on the upper surface of the external flange portion 7a. The external diameter of the external flange portion 7a is larger than the hole diameter of the first penetration hole 2b. A peripheral bulging portion 7c is formed on an external peripheral portion of the cylindrical seal body 7 and at a position substantially in the middle of the external peripheral portion in the vertical direction. A gap having the size corresponding to the thickness of the top portion 2a is formed between the peripheral bulging portion 7c and the external flange portion 7a. A peripheral inclination surface 7d, with which the external diameter of the cylindrical seal body 7 decreases as it gets closer to the cylinder lower end, is formed between the peripheral bulging portion 7c and the cylinder lower end of the cylindrical seal body 7.

Figure 9:
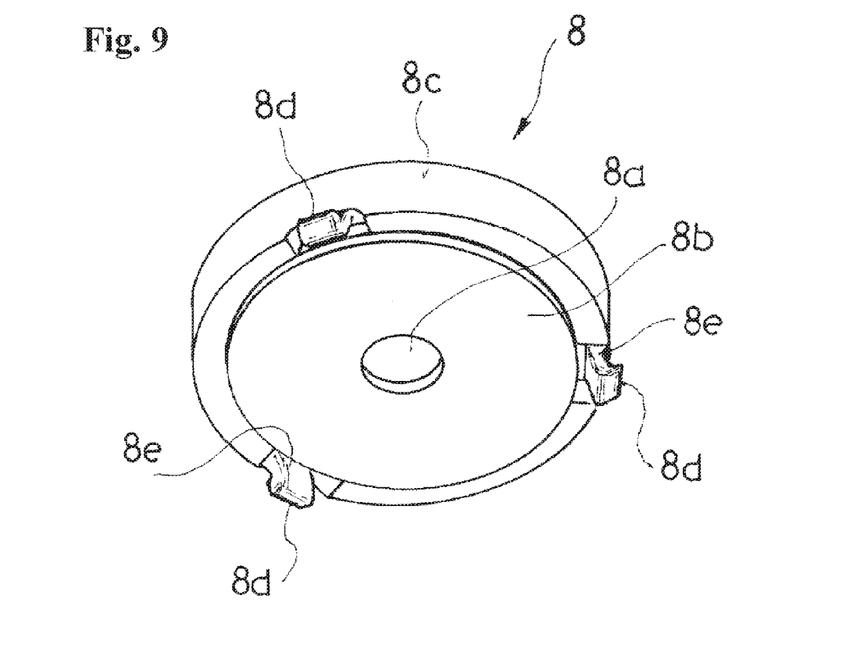
FIG. 9 is a perspective view illustrating a sandwich member constituting the valve device.
Figure 10:
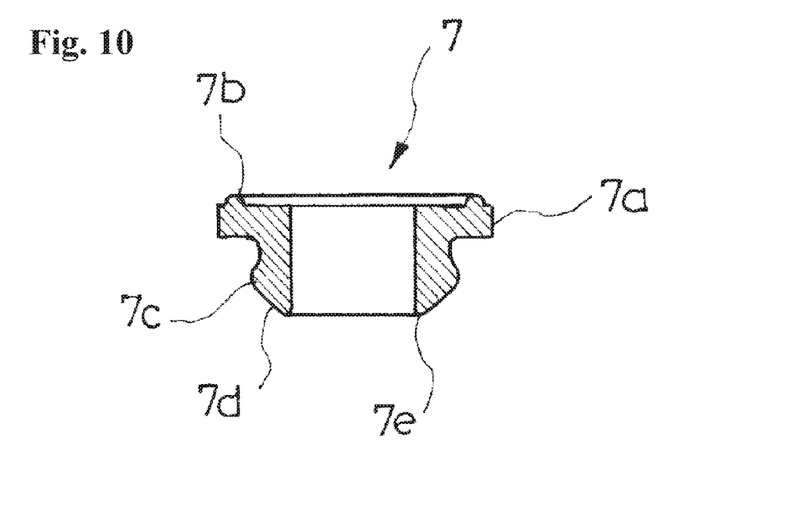
FIG. 10 is a cross sectional view illustrating a cylindrical seal body constituting the valve device.

The sandwich member 8 includes a circular plate shaped bottom portion 8b and a peripheral rising portion 8c making an outer edge of the circular plate shaped bottom portion 8b (see FIG. 9). The second penetration hole 8a in the circular shape is formed in the center of the circular plate shaped bottom portion 8b. The external diameter of the sandwich member 8 is substantially the same as the internal diameter of the small-size cylindrical portion 2c.

The upper valve body 3 is made of a weight made into a circular plate shape in the example of the drawing. The external diameter of the upper valve body 3 is slightly smaller than the internal diameter of the peripheral rising portion 8c of the sandwich member 8 (see FIG. 3). The upper valve body 3 is typically made of metal.

In the example of the drawing, the cylindrical seal body 7 is fit in the first penetration hole 2b from above in such a manner that a cylinder lower end side thereof is fit first. At the position where it has been completely fit, the external flange portion 7a of the cylindrical seal body 7 is in contact with the outer surface of the top portion 2a, and the peripheral bulging portion 7c is in contact with the inner surface of the top portion 2a.

As described above, from a state in which the cylindrical seal body 7 is fit into the first penetration hole 2b, the sandwich member 8 is fit into the small-size cylindrical portion 2c formed above the top portion 2a to be combined with the case 2 so that the external flange portion 7a of the cylindrical seal body 7 is sandwiched between top portion 2a and the circular plate shaped bottom portion 8b of the sandwich member 8. More specifically, in the example of the drawing, a portion of the cylindrical seal body 7 sandwiched between the top portion 2a and the sandwich member 8 serves as the external flange portion 7a.

In this embodiment, any one of the top portion 2a of the case 2 and the sandwich member 8 is provided with an engaging claw 8d which is to be engaged with an engaged unit provided on the other of the top portion 2a of the case 2 and the sandwich member 8. Accordingly, the sandwich state of a portion of the cylindrical seal body 7 is maintained.

In the example of the drawing, the engaging claw 8d is provided on the sandwich member 8. The engaging claw 8d protrudes outward from the end of an elastic piece 8e protruding downward from the outer edge of the circular plate shaped bottom portion 8b of the sandwich member 8. In the example of the drawing, the engaging claws 8d are provided at three portions with a gap between adjacent engaging claws 8d in such a direction to circulate the center of the sandwich member 8 (see FIG. 9). The diameter of a virtual circle passing through the claw ends of the engaging claws 8d . . . 8d at three portions is slightly larger than the internal diameter of the small-size cylindrical portion 2c.

Figure 5:
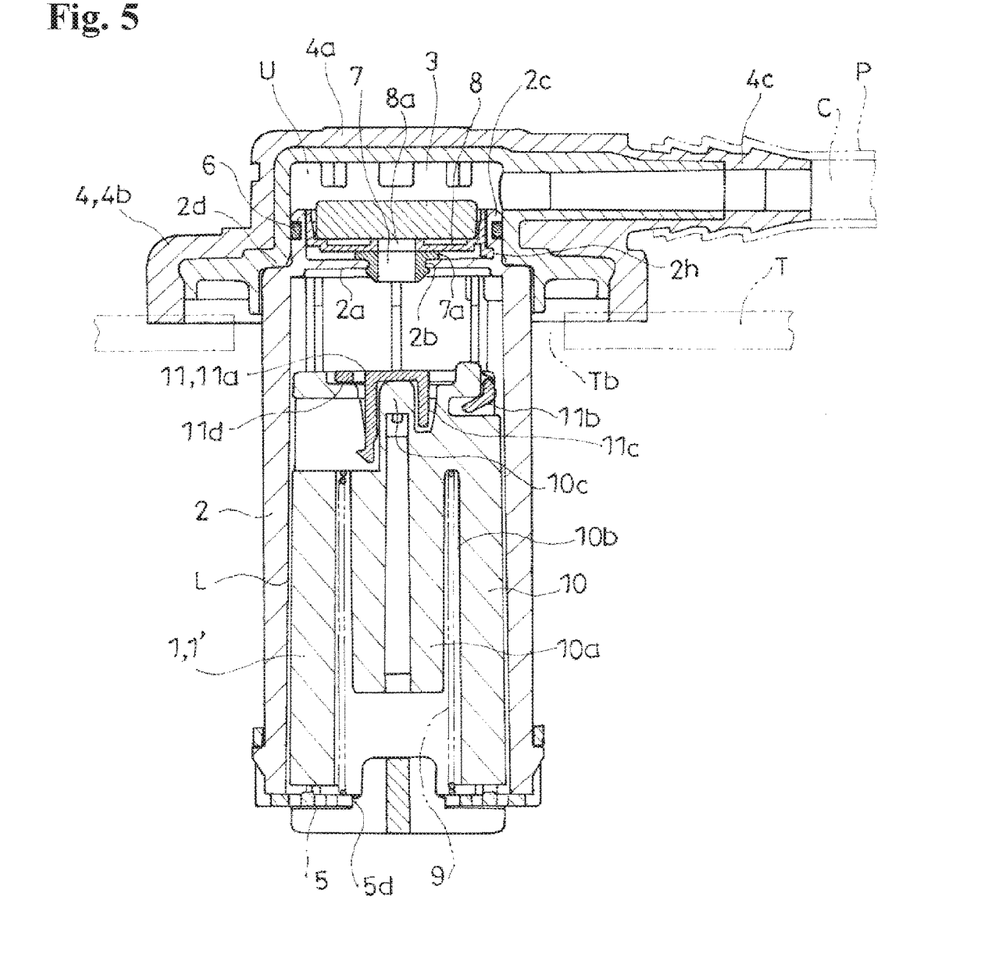
FIG. 5 is a cross sectional view taken along line A-A of FIG. 4, and illustrates a state where a float is at a descended position.

In the example of the drawing, the engaged unit is made of a recessed portion 2h formed on the inner surface side of the cylinder lower end of the small-size cylindrical portion 2c (see FIG. 5). The fitting of the sandwich member 8 into the small-size cylindrical portion 2c is tolerated by elastic deformation of the elastic piece 8e. With an elastic recovery of the elastic piece 8e at an fitting end position of this sandwich member 8, the engaging claw 8d is fit and engaged with the recessed portion 2h serving as the engaged unit.

As described above, after the sandwich member 8 is coupled with the top portion 2a of the case 2, the upper valve body 3 is accommodated in the peripheral rising portion 8c of the sandwich member 8 so that the plate surface is horizontal (see FIG. 5).

The case 2 having the upper valve body 3 arranged above the top portion 2a and the flange are combined as described above, so that a valve device is made.

In the example of the drawing, the valve device is attached to the fuel tank T by fixing the external flange portion 4b of the flange 4 to the outer surface portion of the fuel tank T by means of, e.g., welding in a typical case, in such a state that the valve device below the flange 4 is inserted into the attachment hole Tb which is provided in an opened manner in the upper portion of the fuel tank T. The discharge port 4c is fit into one end of a tube body P constituting the airflow passage C.

When the lower end of the float 1' is at the descended position where contacts the cap 5 (see FIG. 5), the inside and the outside of the tank are allowed to communicate with each other via the inlet portion 5d, the cylindrical seal body 7, the second penetration hole 8a, and the discharge port 4c. When the fuel flows into the lower chamber L, the cylinder lower end of the cylindrical seal body 7 facing the lower chamber L serves as a valve seat 7e (see FIG. 10), and the float 1' ascends to a position where the valve body 1 provided thereabove is seated on the valve seat 7e. As a result, the communication between the inside and the outside of the tank is shut off. When the fuel flows out of the lower chamber L, the float 1' descends again, and the inside and the outside of the tank are allowed to communicate with each other via the valve device.

In the example of the drawing, the second penetration hole 8a which is caused to communicate with the lower chamber L via the cylindrical seal body 7 with the upper valve body 3 is normally closed from the side of the upper chamber U. In the example of the drawing, the circular plate shaped bottom portion 8b of the sandwich member 8 is formed with an annular bulging portion 8f forming an edge of the second penetration hole 8a (see FIG. 3), and this annular bulging portion 8f functions as a valve seat 8g of the upper valve body 3. More specifically, in the example of the drawing, the upper valve body 3 is a valve body making a check valve which is opened and closed in accordance with a pressure difference between the inside and the outside of the tank. In this embodiment, the upper valve body 3 is seated by its own weight to close the second penetration hole 8a, and the upper valve body 3 is separated in accordance with the increase in the pressure within the tank to open the second penetration hole 8a. It should be noted that the upper valve body 3 may be configured to open and close in accordance with the pressure difference between the inside and the outside of the tank, and although not shown in the drawing, for example, something urged from below by a spring to close the second penetration hole 8a from the side of the upper chamber U may be substituted for the upper valve body 3.

With the valve device according to this embodiment, firstly, the sandwich member 8 is combined with the top portion 2a of the case 2, and the cylindrical seal body 7 capable of constituting the valve seat 7e of the lower valve body 1 can be provided in the top portion 2a of the case 2 in a rigid manner with a simple structure. Secondly, a portion of the cylindrical seal body 7 is sandwiched by the top portion 2a and the sandwich member 8, so that the top portion 2a and the cylindrical seal body 7 can be sealed in an air-tight state, and the cylindrical seal body 7 and the sandwich member 8 can be sealed in an air-tight state. In the example of the drawing, with the sandwiching, the external flange portion 7a of the cylindrical seal body 7 is brought into pressurized contact with the hole edge portion of the first penetration hole 2b of the top portion 2a and the hole edge portion of the second penetration hole 8a of the sandwich member 8 in such a state that the external flange portion 7a of the cylindrical seal body 7 is elastically deformed, so that the communication of air between the lower chamber L and the upper chamber U is performed only through the inside of the cylindrical seal body 7. With the valve device according to this embodiment, thirdly, the configuration of both of or any one of the sandwich member 8 and the upper valve body 3 is changed without changing any configuration other than the sandwich member 8 and the upper valve body 3, so that, for example, the flow rate characteristics of the valve device and the open valve pressure can be easily adjusted as necessary by changing the hole diameter of the second penetration hole 8a and the weight of the upper valve body 3. A valve device having different characteristics and the like can be easily provided by sharing main components.

The sandwich member 8 may be combined with the top portion 2a so that a portion of the cylindrical seal body 7 may be sandwiched between the top portion 2a and the sandwich member 8, and although not shown in the drawings, for example, the sandwich member 8 may be configured to be coupled with the case 2 as a result of a twisting operation after the fitting in the small-size cylindrical portion 2c of the case 2.

The float 1' includes a float main body 10 and a valve body 11 provided above the float main body 10 to be able to incline.

In the example of the drawing, the float main body 10 includes an annular space 10b that substantially closes the upper end and that circulates a core portion 10a provided inside thereof, and has a cylindrical shape in which the annular space 10b is open at the lower end side. A compression coil spring 9 is accommodated in the annular space 10b. The compression coil spring 9 always exerts a certain level of urging force to the float 1' in an upward direction by bringing the spring upper end into contact with an innermost portion of this annular space 10b and bringing the spring lower end into contact with the bottom plate 5b of the cap 5.

The valve body 11 has the following (1) to (4) portions:

(1) a seal portion 11a for closing the first penetration hole 2b when the float 1' ascends;

(2) a catch portion 11b caught by a portion of the main body of the float 1' and serving as the center of inclination movement;

(3) a contact portion 11c protruding from the backside of the seal portion 11a; and (4) a fulcrum portion 11d contacting with the lower end of the cylindrical seal body 7 during the inclination movement.

The valve device according to this embodiment uses a contact of the contact portion 11c contacting to a contacted portion 10c formed on the upper side of the float main body 10 in accordance with the inclination movement based on the inclination movement to cause the valve body 11 to move in a horizontal direction.

When the fuel flows into the case 2, the first penetration hole 2b is closed by the seal portion 11a of the valve body 11 of the float 1' that is ascended accordingly, so that the fuel is prevented from flowing into the upper chamber U3. When the fuel flows out from the case 2, the float 1' is able to descend, but since the float main body 10 and the valve body 11 are connected at the side of the catch portion 11b and are not connected at the side of the fulcrum portion 11d, the valve body 11 causes the fulcrum portion 11d to contact with the lower end of the cylindrical seal body 7 to make an inclination movement with this contact point being the fulcrum in such a manner that the side of the catch portion 11b is a lower side of the inclination. Together with this, when the valve body 11 makes the inclination movement, the valve body 11 causes the contact portion 11c to contact with the contacted portion 10c, but since the position of the contacted portion 10c in the horizontal direction does not change, the valve body 11 is moved in the horizontal direction while making the inclination movement. As a result, even in a case where the inside of the tank is at a high pressure, or even in a case where the seal portion 11a and the cylindrical seal body 7 are made of materials that are likely to close contact with each other, separation of the seal portion 11a and the cylindrical seal body 7, i.e., a smooth opening of the valve in the valve device is realized.

It is to be understood that the present invention is not limited to the embodiment explained above, and includes all the embodiments that can achieve the object of the present invention.

REFERENCE SIGNS LIST

1 lower valve body
1' float
2 case
2a top portion
2b first penetration hole
3 upper valve body
7 cylindrical seal body
8 sandwich member
8a second penetration hole
T fuel tank
C airflow passage All the contents of the specification, claims, drawings, and abstract of Japanese Patent Application No. 2014-097411 filed on May 9, 2014, are referred to, and are incorporated herein as the disclosure of the specification of the present invention.

What is claimed is:

1. A valve device constituting a part of an airflow passage of a fuel tank, comprising:
  a float constituting a lower valve body;
  a case accommodating the float, and including a top portion having a first penetration hole;
  a sandwich member including a bottom portion formed in a circular plate and having a second penetration hole, and a peripheral rising portion protruding upwardly from an outer edge of the bottom portion to form a space thereinside with the bottom portion;
  a cylindrical seal body inserted in the first penetration hole and arranged under the sandwich member to communicate an inside of the seal body with the second penetration hole of the sandwich member, the seal body including an external flange portion sandwiched between the top portion of the case and the bottom portion of the sandwich member; and
  an upper valve body stored in the space between the bottom portion and the peripheral rising portion of the sandwich member, and configured to open and close the second penetration hole as a check valve in accordance with a pressure difference between an inside and an outside of the tank.

2. The valve device according to claim 1, wherein the upper valve body is configured to be seated by an own weight of the upper valve body to close the second penetration hole, and is configured to be separated therefrom in accordance with an increase of a pressure in the tank to open the second penetration hole.

3. The valve device according to claim 1, wherein one of the top portion of the case and the sandwich member includes an engaging claw, and another of the top portion of the case and the sandwich member includes an engaged unit to be engaged to the engaging claw.

4. A valve device constituting a part of an airflow passage of a fuel tank, comprising:
  a float constituting a lower valve body;
  a case accommodating the float, and including a top portion having a first penetration hole;
  a sandwich member having a second penetration hole;
  a cylindrical seal body inserted in the first penetration hole, and arranged under the sandwich member to communicate an inside of the seal body with the second penetration hole of the sandwich member, the seal body including a circular external flange portion protruding circumferentially from an upper portion of the seal body and having an external diameter larger than a hole diameter of the first penetration hole, the external flange portion being sandwiched between the top portion of the case and the sandwich member; and an upper valve body disposed on the sandwich member, and configured to open and close the second penetration hole as a check valve in accordance with a pressure difference between an inside and an outside of the tank, wherein the seal body is made of plastics having rubber or rubber elasticity.

5. The valve device according to claim 1, wherein the peripheral rising portion of the sandwich member includes an inclined inner surface having an inner diameter gradually narrowed in a direction toward the bottom portion, and when the upper valve body is opened, the upper valve body is separated from the sandwich member to form a ventilation passage between the inclined inner surface of the sandwich and the upper valve body.

6. The valve device according to claim 1, wherein the external flange portion is formed at an upper portion of the seal body and is sandwiched between the top portion of the case and the bottom portion of the sandwich member, and the seal body further includes a peripheral ridge protruding upwardly from an upper surface of the external flange portion, and a peripheral inclination surface arranged at a lower portion of the seal body and inserted in the first penetration hole of the case.

7. The valve device according to claim 6, wherein the case further includes a cylindrical portion protruding upwardly from an upper surface of the top portion thereof, and a recessed portion formed between an inner surface of the cylindrical portion and the upper surface of the top portion, and the sandwich member further includes an engaging claw protruding outwardly from an outer edge of the bottom portion, and fitting into the recessed portion to fix the sandwich member to the case.

8. The valve device according to claim 4, wherein the sandwich member includes a bottom portion having the second penetration hole, and a peripheral rising portion protruding upwardly from an outer edge of the bottom portion and having an inclined inner surface with an inner diameter gradually narrowed in a direction toward the bottom portion, and when the upper valve body is opened, the upper valve body is separated from the sandwich member to form a ventilation passage between the inclined inner surface of the sandwich and the upper valve body.

9. The valve device according to claim 4, wherein the external flange portion of the seal body is sandwiched between the top portion of the case and the sandwich member.

* * * * *